United States Patent [19]

Hollinger et al.

[11] Patent Number: 5,015,095

[45] Date of Patent: May 14, 1991

[54] CLOSED-LOOP FIBER-OPTIC ANGULAR RATE SENSOR INCLUDING A MIXER ARRANGEMENT FOR MEASURING ROTATIONAL DIRECTION AND RATE

[75] Inventors: Walter P. Hollinger, Mahwah; Ahmed Aboyoussef, Lakewood; Walter V. Werner, Caldwell, all of N.J.

[73] Assignee: Allied-Signal Inc., Morris Township, Morris County, N.J.

[21] Appl. No.: 400,175

[22] Filed: Aug. 28, 1989

[51] Int. Cl.⁵ .............................................. G01B 9/02
[52] U.S. Cl. .................................................. 356/350
[58] Field of Search ........................ 356/350, 345, 349

[56] References Cited
FOREIGN PATENT DOCUMENTS
0216211 10/1985 Japan .................................. 356/350

Primary Examiner—Samuel Turner
Attorney, Agent, or Firm—Howard G. Massung; Robert A. Walsh

[57] ABSTRACT

The direction and rate of rotation of a closed-loop fiber-optic angular rate sensor is determined by employing acousto-optic modulators in each arm of the sensor and determining the frequency difference between the modulators. Since the modulators operate at a relatively high frequency, frequency measurements to within several hertz are implemented by providing the difference frequency and the sign of the difference frequency via the use of electronic mixers. Since the maximum difference frequency is in the order of a few megahertz, standard counters can thus be used to accurately measure the reduced frequency and hence provide information relating to the direction and rate of rotation.

13 Claims, 3 Drawing Sheets

CLOSED-LOOP FIBER-OPTIC ANGULAR RATE SENSOR INCLUDING A MIXER ARRANGEMENT FOR MEASURING ROTATIONAL DIRECTION AND RATE

BACKGROUND OF THE INVENTION

Fiber-optic angular rate sensors, i.e. gyroscopes, are being implemented to replace mechanical angular rate sensors used for guidance, control and navigation purposes. Fiber-optic devices turn on instantly, have long shelf life and are virtually maintenance free. As "strapdown devices" they do not require expensive gimballed mounting systems and are not encumbered by low rotational rate lock-in that causes other optical angular rate sensors to provide inaccurate outputs at low angular rates.

Fiber-optic angular rate sensors exploit George Sagnac's concept of exciting an interferometer from an external optical source and directly measuring the phase shift of two counterpropagating light beams after they traverse a closed path. In the case of a fiber-optic device the path is a glass fiber instead of Sagnac's original free space, and the effective sensitivity of the device is enhanced by using multiple turns of fiber in a coil arrangement.

Basic fiber-optic angular rate sensors use a beam from a single optical source and divide the beam into two beams. The two beams are directed in opposite directions (counterpropagated) through a multi-turn fiber-optic coil. Rotation of the coil produces Sagnac phase shifts in each beam that are equal in magnitude but opposite in sign. The phase difference between the two optical beams is linearly proportional to the rotational rate of the coil. Most configurations use a phase modulator to increase the sensitivity of the device for small angle rotations and to reduce noise by measuring the phase at the modulation frequency.

The principals of the above described technology are described in an article entitled *Fiber-Optic Gyroscopes* by B. Y. Kim and H. J. Shaw published in the March, 1986 issue of "IEEE Spectrum", pages 54–60, the same being incorporated herein by reference.

Fiber-optic gyroscopes of the type described above use acousto-optic modulators in each arm of the interferometer. Rotational rate of the sensor is determined by the frequency difference between each modulator. Since each modulator operates in a frequency range near 100 megahertz, frequency measurements to within several hertz are difficult and costly to implement.

The present invention provides the frequency difference and the sign of the frequency difference by using electronic mixers. Since the maximum frequency difference is in the order of several megahertz, standard electronic counters can be used to accurately determine the decreased frequency.

SUMMARY OF THE INVENTION

This invention contemplates a closed-loop fiber-optic angular rate sensor including a mixer arrangement for detecting rotational direction and rotational rate of the sensor. In the disclosed arrangement two voltage controlled oscillators are provided, each of which drives a corresponding acousto-optic modulator. In order to accurately measure the frequency difference between the two counterpropagating waves in the interferometer, each voltage controlled oscillator is tapped and the difference between the oscillator output frequencies is obtained by using an electronic mixer. Since the mixer provides both the sum and the difference frequency of the voltage controlled oscillators, a low pass filter is required to eliminate the sum frequency. The remaining difference frequency is used to determine rotational rate. A zero (DC) frequency will indicate low net rotation, while a frequency of several megahertz will indicate full scale rotation. Thus, by using a mixer the voltage controlled oscillator frequency is reduced from approximately 100 megahertz to a few megahertz making data acquisition feasible for a standard electronic counter. The counter counts the frequency difference to provide rotational rate. Control signals for the counter are derived from clockwise or counter-clockwise rotation.

Another mixer is used which has a 90 degree phase shifted local oscillator signal input. With the described arrangement one mixer determines the frequency difference i.e. rotational rate. The other mixer determines the direction of rotation.

DETAILED DESCRIPTION OF THE INVENTION

Figure 1:
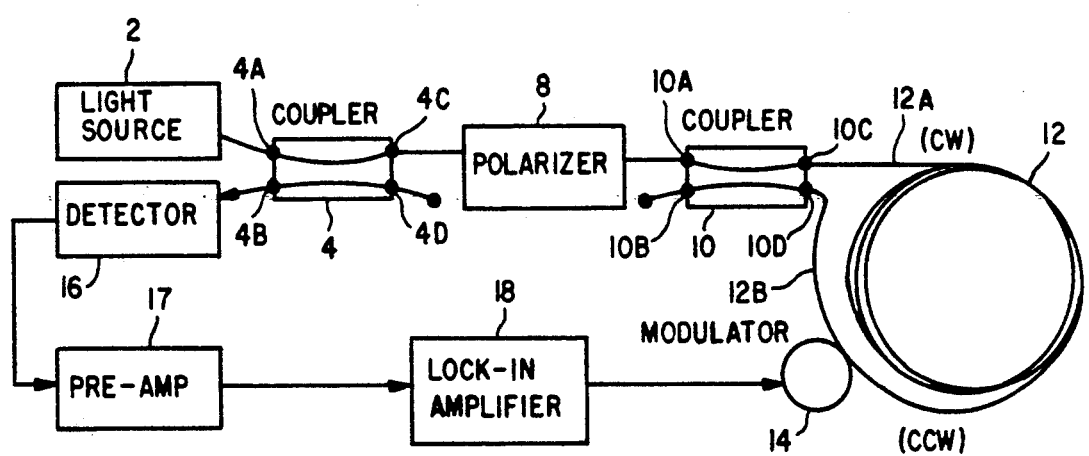
FIG. 1 is a schematic representation illustrating a basic prior art fiber-optic angular rate sensor configuration.

With reference to FIG. 1 a typical and basic prior art fiber-optic angular rate sensor is shown, and will be described as background information preparatory to describing the particular configuration of the present invention. Thus, FIG. 1 shows a light source 2. Light source 2, which may be a laser or a superluminescent diode, generates a light beam. A coupler 4, a polarizer 8 and a coupler 10 are sequentially coupled to one end 12A of a multi-turn fiber-optic coil 12 so that the light beam from light source 2 is transmitted through coupler 4, polarizer 8, coupler 10 and coil 12.

Coupler 4 has four ports, i.e. ports 4A, 4B, 4C and a usually "dead" port 4D. The light beam from light source 2 is transmitted to coupler 4 through port 4A and is transmitted from the coupler through port 4C and "dead" port 4D. Coupler 4 may be a fused tapered fiber coupler, a polished block coupler or an integrated optic circuit. In any event the coupler is a directional coupler and is a guided-wave equivalent of the well known half-silver mirror or beam-splitter which splits one optical beam into two beams or combines two beams into one beam. The structural details of a coupler of the type contemplated are described in the article *Fiber-Optic Gyroscopes*, supra.

The light transmitted through coupler port 4C is transmitted to polarizer 8. In connection with polarizer 8 it will be understood that the polarizer is, in effect, a filter and is only required in higher performance applications in which high bi-refringent, polarization maintaining fibers are utilized. The structural details of a polarizer of the type contemplated are likewise described in the article *Fiber-Optic Gyroscopes*, supra.

Coupler 10 is similar to coupler 4 and has four ports, i.e. ports 10A, 10C, 10D and a "dead" port 10B. A polarized or filtered light beam from polarizer 8 is transmitted to port 10A of coupler 10. Coupler 10 splits the light beam into two counterpropagating light beams which travel around multi-turn fiber-optic coil 12 coupled at one end 12A to port 10C and coupled at an opposite end 12B to port 10D. Thus, one light beam travels around coil 12 in a clockwise (CW) direction and the other light beam travels around coil 12 in a counter-clockwise (CCW) direction as indicated in FIG. 1.

As coil 12 rotates as part of a guidance, control or navigation system, the counterpropagating light beams are phase shifted with respect to each other. This differential phase shift is commonly referred to as the Sagnac relativistic phase shift.

A phase modulator 14 is disposed at end 12B of coil 12 and causes a time varying modulation of the differential phase shift between the two counterpropagating beams. In this connection, modulator 14 may be a mechanical oscillator (e.g., a PZT ring) or an integrated optic phase shifter as is well known in the art.

The counterpropagating light beams traveling around coil 12 are transmitted to coupler 10 via ports 10C and 10D whereby light beams are provided at coupler ports 10A and 10B. The light beam at port 10A is transmitted to polarizer 8 and the polarized and filtered light beam from polarizer 8 is transmitted to coupler 4 via port 4C and is finally transmitted from coupler port 4B to detector 16. Detector 16 provides an electrical (AC) signal which is applied to a pre-amp 17 and therefrom to a phase sensitive demodulator such as a lock-in amplifier 18 which measures the electrical signal from detector 16 at the phase modulation frequency of modulator 14. The several couplers, and polarizers illustrated and described in FIG. 1 are collectively referred to as the fiber-optic angular rate sensor optics.

With FIG. 1 and the associated description thereof in mind, the particular structural implementation of the present invention will be described with reference to FIG. 2.

Figure 2:
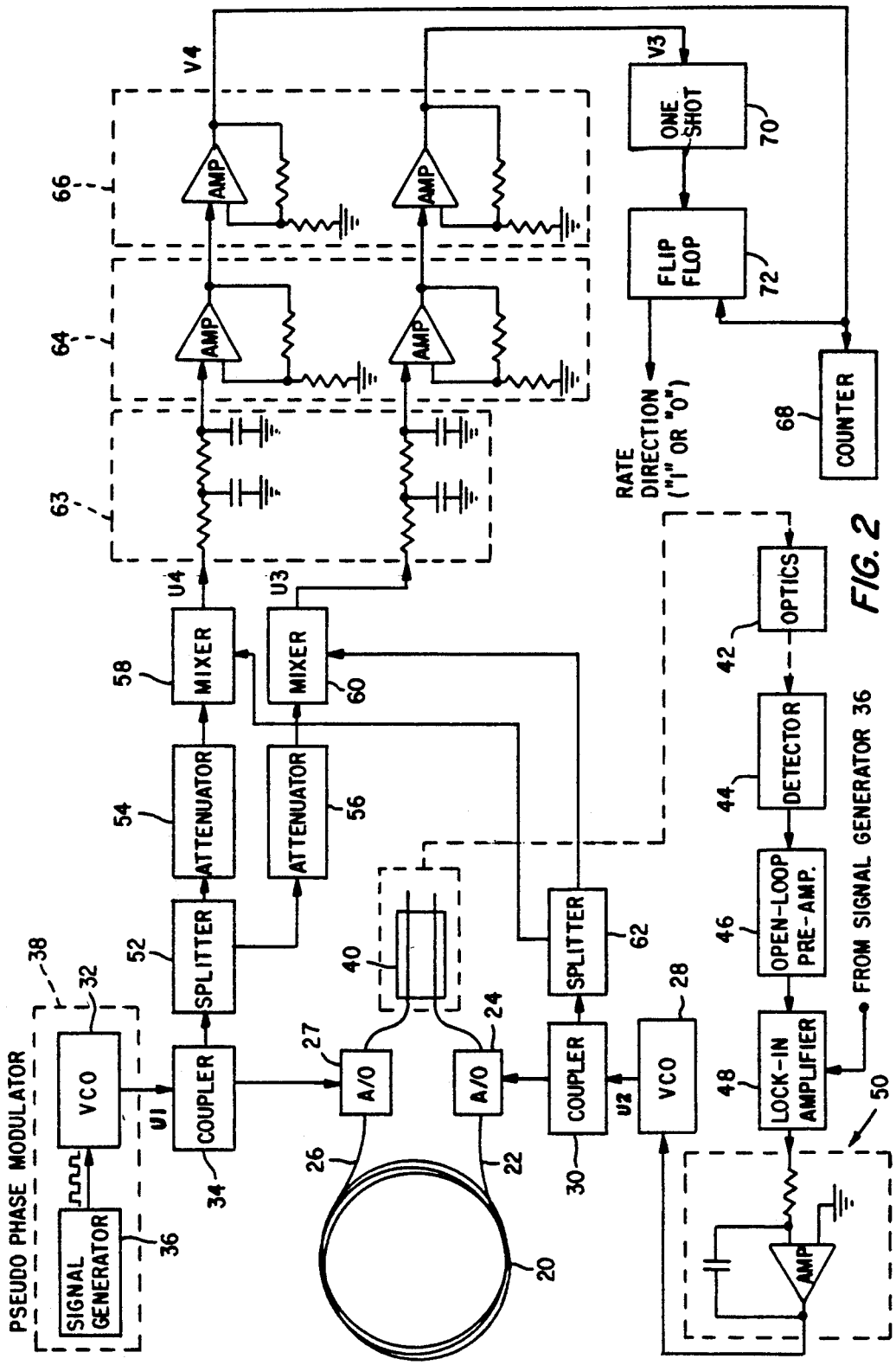
FIG. 2 is a block diagram-electrical schematic representation illustrating a fiber-optic angular rate sensor implementation in accordance with the invention.

FIG. 2 shows a multi-turn fiber-optic coil 20 having one end 22 connected to an acousto-optic (A/0) modulator 24 and another end 26 connected to a like acousto-optic (A/0) modulator 27. Acousto-optic modulator 24 is driven by a voltage controlled oscillator (VCO) 28 through a coupler 30, and acousto-optic modulator 27 is driven by a voltage controlled oscillator (VCO) 32 through a coupler 34. Voltage controlled oscillator, 32 is driven by a signal generator 36. Voltage controlled oscillator 32 and signal generator 36 cooperate to provide a pseudo-phase modulator 38.

A coupler 40 is connected to acousto-optic modulator 24 and to acousto-optic modulator 27. Coupler 40 provides an optical output via rate sensor optics as described with reference to FIG. 1, with said optics being collectively designated by the numeral 42 in FIG. 2. Thus, the optical output provided by optics 42 is detected by a detector 44 which provides an electrical signal. The electrical signal from detector 44 is applied through a pre-amp 46 to a lock-in amplifier or demodulator 48. Lock-in amplifier 48 is driven by signal generator 36. The electrical signal from lock-in amplifier 48 is integrated by an integrator 50 to provide an integrated electrical signal which is applied to voltage controlled oscillator 28. Voltage controlled oscillator 28 drives acousto-optic modulator 24 through coupler 30 as aforenoted.

Coupler 34 provides an output which is applied to a splitter 52. Splitter 52 provides one output which is applied to an attenuator 54 and another output which is applied to an attenuator 56. The output from attenuator 54 is applied to a mixer 58 and the output from attenuator 56 is applied to a mixer 60.

Figure 3:
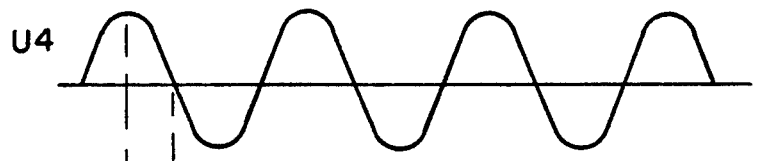
FIGS. 3–4 are diagrammatic representations illustrating sinusoidal waveforms provided by mixers in accordance with the invention.
Figure 4:
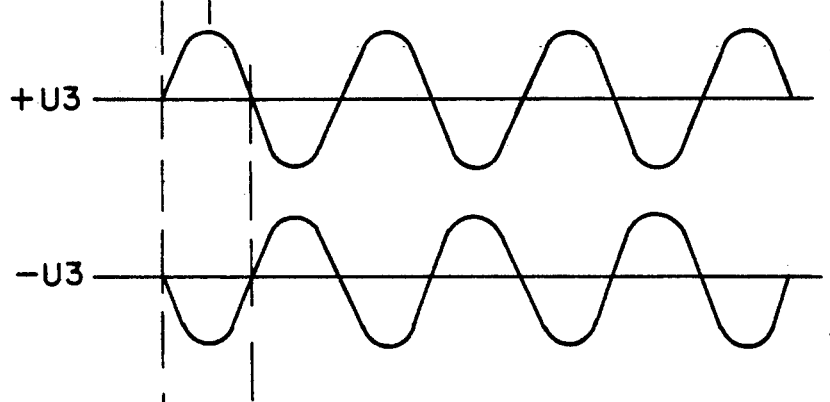

Coupler 30 provides an output which is applied to a splitter 62. Splitter 62 provides one output which is applied to mixer 58 and another output which is applied to mixer 60. With the arrangement shown and described, the output of mixer 58, which is designated as U4, has a sinusoidal waveform as shown in FIG. 3. The output of mixer 60, which is designated as U3, has sinusoidal waveforms as shown in FIG. 4. The outputs from mixer 60 are in a 90 degree phase shifted relation to the output from mixer 58. In this connection it will be understood that the arrangement of splitter 62 is such that mixer 60 receives a 90 degree phase shifted local oscillator input from splitter 62.

Figure 5:
FIGS. 5–6 are diagrammatic representations illustrating square waveforms provided in response to the sinusoidal waveforms shown in FIGS. 3–4.
Figure 6:
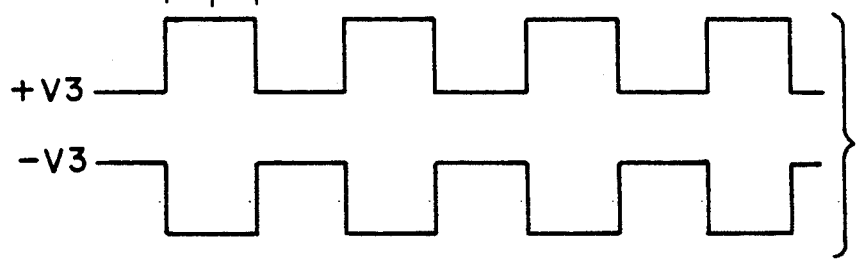

Output U4 from mixer 58 and output U3 from mixer 60 are applied to a dual low pass filter arrangement 63. The dual outputs from dual low pass filter arrangement 63 are applied through a dual amplifier arrangement 64 to a dual waveform squaring arrangement 66. Dual waveform squaring arrangement 66 provides an output V4 having a square waveform as shown in FIG. 5 and provides outputs V3 having square waveforms as shown in FIG. 6.

Output V4 is applied to a counter 68 which counts the output and provides a count indicative of rotational rate. Output V3 is applied to a one shot multivibrator 70 and the output from one shot multivibrator 70 is applied to a flipflop 72. Output V4 is applied to flip-flop 72. With the arrangement shown and described, flip-flop 72 provides a logic "1" or a logic "0" output indicative of the direction of rotational rate, wherein logic "1" is indicative of one direction and logic "0" is indicative of the opposite direction.

Thus, there has been shown and described with reference to FIG. 2 a configuration for detecting rotational direction and rate of a closed-loop fiber-optic angular rate sensor. In this configuration two voltage controlled oscillators 28 and 32 drive the respective acousto-optic modulators 24 and 27. To accurately measure the frequency difference between the two counterpropagating waves in multi-turn fiber-optic coil 20, each voltage controlled oscillator is tapped and the difference between the oscillator frequencies is obtained via mixer 58. Since mixer 58 provides both the sum and the difference frequencies of the voltage controlled oscillators, low pass filter 63 is necessary to eliminate the sum frequency. The remaining difference frequency is used to determine rotational rate. As aforenoted, a zero or DC frequency indicates no net rotation while a frequency of several megahertz indicates full scale rotation. Hence, by using mixers the voltage controlled oscillator frequency is reduced from approximately 100 megahertz to a few megahertz, making data acquisition feasible for standard counters such as counter 68. Counter 68 counts the frequency difference as indicated by square wave signal V4 to determine rotational rate.

The control signals for counter 68 are related to clockwise or counter-clockwise rotation. Mixer 60 is used which has a 90 degree phase shifted local oscillator input from splitter 62. As indicated in FIG. 2, the output (U4) of one mixer (58) yields the frequency difference of the acousto-optic modulators. The other mixer (60) output (U3) provides information as to the relative direction of rotation. The principle of determining the direction of rotation can be readily understood from the analysis which follows below.

$$U4 = U1 \cdot U2;$$
$$= U1 \sin \omega 1\tau \cdot U2 \sin \omega 2\tau;$$
$$= U1U2 \tfrac{1}{2}[\cos(\omega 1\tau - \omega 2\tau) - \cos(\omega 1\tau + \omega 2\tau)],$$

where $U1 \sin \omega 1\tau$ is the output of VCO 32 and $U2 \sin \omega 2\tau$ is the output of VCO 28.

After filtering out $(\omega 1 + \omega 2)$, the sum component, via dual low pass filter arrangement 63, the following results:

$$U4 = \tfrac{1}{2} U1\, U2 \cos (\omega 1 - \omega 2)\tau.$$

Similarly for U3:

$$U3 = U1 \sin \omega 1\tau \cdot U2 \sin(\omega 2 + 90°)\tau$$
$$= U1 \sin \omega 1\tau \cdot U2 \cos \omega 2\tau$$
$$= U1U2 \tfrac{1}{2}[(\sin(\omega 1\tau + \omega 2\tau) + \sin(\omega 1\tau - \omega 2\tau)]$$

After filtering out $(\omega 1 + \omega 2)$, the sum component, by dual filter arrangement 63, the following results:

$$U3 = \tfrac{1}{2} U1\, U2 \sin (\omega 1 - \omega 2)\tau.$$

By assuming that $\omega 1$ is larger than $\omega 2$ (for clockwise rotation), and further assuming a difference of 1, the following is established:

$$\omega 1 - \omega 2 = 1.$$

Also, by letting $\tfrac{1}{2}\, U1\, U2 = \kappa$, where $\kappa$ is a constant, then
$U3 = \kappa \sin \tau$ and
$U4 = \kappa \cos \tau$.
Since, for a counter-clockwise rotation, $$\omega 1 - \omega 2 = -1$$

then:
$U3 = \kappa \sin (-\tau) = -\kappa \sin \tau$, and
$U4 = \kappa \cos (-\tau) = \kappa \cos \tau$.

Depending upon whether the angular rate sensor is rotating clockwise or counter-clockwise, a 180 degree phase reversal results. By squaring signals U4 and U3 via squaring device 66, signals V4 and V3 are obtained, so that the relative direction of rotation can be determined by noting the polarity of U3 on every positive transition of U4. If U3 is positive, an up count signal V4 results. If U3 is negative, a down count signal V4 results. Signal V4 is applied to counter 68 so that the counter up-counts or down-counts, as the case may be.

There has thus been described an arrangement for determining the rotational direction and rate of a closed-loop fiber-optic angular rate sensor. The arrangement uses acousto-optic modulators in each arm of a fiber-optic coil and determines the frequency difference between each modulator. Since each modulator operates near 100 megahertz, frequency measurements to within several hertz are difficult to implement. The disclosed invention determines the frequency difference and the sign of the frequency difference via signal mixers. Since the maximum frequency difference is thus in the order of several megahertz, a standard counter can be used to accurately measure the reduced frequency.

The several components of the invention referred to herein are commercially available and otherwise known in the art. Accordingly, only as much of the components have been shown and described as is necessary to understand the invention. In any event, the novelty of the invention resides in the arrangement of the components and not in the components themselves.

With the above description of the invention in mind reference is made to the claims appended hereto for a definition of the scope of the invention.

What is claimed is:

1. A closed-loop fiber-optic angular rate sensor having a multi-turn fiber-optic coil with two ends and with two counterpropagating light beams being transmitted through the coil so that the frequency difference between the two counterpropagating light beams is proportional to the rotational rate of the sensor, and having an arrangement for detecting said rotational rate, comprising:
   first modulator means connected to one coil end and second modulator means connected to the other coil end;
   first oscillator means providing a first signal at a first frequency, and said first modulator means connected to the first oscillator means and being driven by the first signal at the first frequency therefrom;
   second oscillator means providing a second signal at a second frequency, and said second modulator means connected to the second oscillator means and being driven by the second signal at the second frequency therefrom;
   first signal mixer means connected to the first and second oscillator means and responsive to the first and second signals at the first and second frequencies therefrom for providing a third signal at a frequency which includes the sum and the difference of the first and second frequencies;
   first filter means connected to the first signal mixer means for filtering out the sum frequency included in the frequency of the third signal therefrom and providing a fourth signal at the difference frequency;
   first signal shaping means connected to the first filter means for shaping the fourth signal therefrom at the difference frequency, and providing a first shaped signal at said difference frequency;
   counter means connected to the signal shaping means for counting the shaped signal at the difference frequency, with the count provided thereby being indicative of the rotational rate;
   second signal mixer means;
   means connected to the second oscillator means for providing a fifth signal at the second frequency which is phase shifted in relation to the second signal from the second oscillator means;
   the second signal mixer means connected to the first oscillator means and to the means for providing the fifth signal and responsive to the first signal and the fifth signal for providing a sixth signal at the frequency which includes the sum and difference of the first and second frequencies;
   second filter means connected to the second signal mixer means for filtering out the sum frequency included in the frequency of the sixth signal from the second signal mixer means so that said sixth signal is at the difference frequency;

second signal shaping means connected to the second filter means for shaping the signal therefrom at the difference frequency and providing a second shaped signal at the difference frequency; and means connected to the first signal shaping means and to the second signal shaping means, and responsive to the first and second shaped signals therefrom at the difference frequency for providing signal at first and second logic levels, with the signal at the first logic level being indicative of rotation of the sensor in one direction and the signal at the second logic level being indicative of rotation of the sensor in the opposite direction.

2. A closed-loop fiber-optic angular rate sensor as described by claim 1, wherein:

the first oscillator means includes a first voltage controlled oscillator;

a signal generator is connected to the first voltage controlled oscillator and provides a signal which controls said first voltage controlled oscillator for providing the first signal at the first frequency;

a first coupler is connected to the first voltage controlled oscillator and to the first modulator means for receiving the first signal at the first frequency and for applying said signal to the first modulator means;

signal splitter means is connected to the coupler for receiving the first signal at the first frequency and for splitting said signal; and the first signal mixer means and the second signal mixer means are connected to the signal splitter means so that the first signal mixer means receives one part of the split signal and the second signal mixer means receives the other part of the split signal.

3. A closed-loop fiber-optic angular rate sensor as described by claim 2, wherein:

the second oscillator means includes a second voltage controlled oscillator;

a detector is responsive to an optical output of the fiber-optic rate sensor for detecting said output and for providing a corresponding electrical signal;

signal integrating means is connected to the detector and to the signal generator and responsive to the signal from the signal generator for integrating the electrical signal to provide an integrated signal;

the second voltage controlled oscillator is connected to the signal integrating means for being controlled thereby to provide the signal at the second frequency;

a second coupler is connected to the second voltage controlled oscillator and to the second modulator means for receiving the signal at the second frequency and for applying said signal to the second modulator means;

a second signal splitter means is connected to the second coupler for receiving the signal at the second frequency for shifting the phase of the received signal and for splitting the phase shifted signal; and the first signal mixer means and the second signal mixer means are connected to the second signal splitter means so that the first signal mixer means receives one part of the phase shifted split signal and the second signal mixer means receives the other part of said phase shifted split signal.

4. A closed-loop fiber-optic angular rate sensor as described by claim 1, wherein:

the first modulator means includes a first acousto-optic modulator and the second modulator means includes a second acousto-optic modulator.

5. A closed-loop fiber-optic angular rate sensor having a multi-turn fiber-optic coil with two ends and with two counterpropagating light beams being transmitted through the coil so that the frequency difference between the two counterpropagating light beams is proportional to the rotational rate of the sensor, comprising:

first modulator means connected to one coil end and second modulator means connected to the other coil end;

first oscillator means providing a first signal at a first frequency, and said first modulator means connected to the first oscillator means and being driven by the first signal at the first frequency therefrom;

second oscillator means providing a second signal at a second frequency, and said second modulator means connected to the second oscillator means and being driven by the second signal at the second frequency therefrom;

first signal mixer means connected to the first and second oscillator means for mixing the first and second signals therefrom and providing a third signal at a frequency which is the difference between the first and second frequencies;

means for counting the difference frequency, with the count provided thereby being indicative of the rotational rate;

means connected to the second oscillator means for shifting the phase of the second signal at the second frequency therefrom;

second signal mixer means connected to the first oscillator means and to the phase shifting means for mixing the signals therefrom and providing a phase-shifted signal at the frequency which is the difference between the first and second frequencies; and means connected to the first signal mixer means and to the second signal mixer means and responsive to the signals therefrom for providing signals at first and second logic levels with the first logic level indicative of rotation of the sensor in one direction and the second logic level indicative of rotation of the sensor in the opposite direction.

6. A closed-loop fiber-optic angular rate sensor, comprising:

a multi-turn fiber-optic coil having two ends and having two counterpropagating light beams transmitted through the coil;

first modulator means connected to one coil end;

second modulator means connected to the other coil end;

first oscillator means providing a signal at a first frequency;

second oscillator means providing a signal at a second frequency;

the first modulator means connected to the first oscillator means and being driven by the signal at the first frequency therefrom;

the second modulator means connected to the second oscillator means and being driven by the signal at the second frequency therefrom;

first signal mixer means connected to the first and second oscillator means for mixing the signals therefrom and providing a signal at a frequency which is the difference between the first and second frequencies;

means for counting the frequency which is the difference between the first and second frequencies, with the count provided thereby indicating the rotational rate of the sensor;

means connected to the second oscillator means for shifting the phase of the signal at the second frequency therefrom;

second signal mixer means connected to the first oscillator means and to the phase shifting means for mixing the signals therefrom and providing a phase shifted signal at the frequency which is the difference between the first and second frequencies; and means connected to the first and second signal mixer means and responsive to the signals therefrom for providing signals at first and second logic levels, with the first logic level being indicative of rotation of the sensor in one direction, and the second logic level being indicative of rotation of the sensor in the opposite direction.

7. A method for determining rotational direction and rate of a closed-loop fiber-optic angular rate sensor having a coil with two ends, and with two counterpropagating light beams being transmitted through the coil so that the frequency difference between the two counterpropagating light beams is proportional to the rotational rate, comprising:

modulating one of the counterpropagating light beams at a first frequency;

modulating the other of the counterpropagating light beams at a second frequency;

mixing the first and second frequencies for providing a first difference frequency which is the difference between said mixed frequencies;

counting said first difference frequency, with said count indicating rotational rate;

shifting the phase of the second frequency;

mixing the first frequency and the phase shifted second frequency for providing a second difference frequency which is the difference between said mixed frequencies; and using the first difference frequency and the second difference frequency for providing signals at first and second logic levels, with the first logic level indicating rotation in one direction and the second logic level indicating rotation in the opposite direction.

8. A method as described by claim 7, wherein mixing the first and second frequencies provides a mixed frequency including both the sum and the difference of said mixed frequencies, and providing the first difference frequency includes:

filtering said mixed frequency for eliminating the sum frequency to provide the first difference frequency.

9. A method as described by claim 8, including:

shaping the first difference frequency for providing a shaped difference frequency; and counting the shaped frequency, with said count indicating rotational rate.

10. A method as described by claim 9 wherein mixing the first frequency and the phase shifted second frequency provides a phase shifted mixed frequency including both the sum and difference of said mixed frequencies, and providing the second difference frequency includes:

filtering said phase shifted mixed frequency for eliminating the sum frequency to provide a phase shifted difference frequency which is the second difference frequency.

11. A method as described by claim 10, including:

shaping the phase shifted difference frequency for providing a shaped phase shifted difference frequency; and using the shaped difference frequency and the shaped phase shifted difference frequency for providing the signals at the first and second logic levels.

12. A method as described by claim 10, including:

filtering said mixed frequency for eliminating the sum frequency providing a sinusoidal waveform difference frequency; and shaping the sinusoidal waveform difference frequency providing a square waveform frequency.

13. A method as described by claim 11, including:

filtering said phase shifted mixed frequency for eliminating the sum frequency providing a phase shifted sinusoidal waveform difference frequency; and shaping the phase shifted sinusoidal waveform difference filtered frequency providing a square waveform frequency.

* * * * *